United States Patent [19]

Jones

[11] Patent Number: 4,650,275
[45] Date of Patent: Mar. 17, 1987

[54] THIN PLASTIC CORRECTOR LENSES FOR OPTICAL SYSTEMS

[76] Inventor: Neal K. Jones, 88 Gladstone Road, North Brighton, South Australia, 5048, Australia

[21] Appl. No.: 713,905
[22] PCT Filed: Jun. 12, 1984
[86] PCT No.: PCT/AU84/00102
  § 371 Date: Feb. 13, 1985
  § 102(e) Date: Feb. 13, 1985
[87] PCT Pub. No.: WO85/00060
  PCT Pub. Date: Jan. 3, 1985

[30] Foreign Application Priority Data
  Jun. 15, 1983 [AU] Australia ............... PF9816

[51] Int. Cl.$^4$ ............ G02B 5/00; B29D 11/00
[52] U.S. Cl. ............................... 350/1.1; 350/417
[58] Field of Search ....................... 350/1.1, 417

[56] References Cited

U.S. PATENT DOCUMENTS

| | | | |
|---|---|---|---|
| 3,876,734 | 4/1975 | Howden | 264/1 |
| 3,893,750 | 7/1975 | D'Amato | 350/189 |
| 3,917,766 | 11/1975 | Howden | 264/1 |
| 3,922,327 | 11/1975 | Howden | 264/1 |
| 4,196,961 | 4/1980 | Walter et al. | 350/6.8 |
| 4,212,836 | 7/1980 | Wu | 264/1 |
| 4,378,953 | 4/1983 | Winn | 350/1.1 |

FOREIGN PATENT DOCUMENTS

| | | |
|---|---|---|
| 666858 | 2/1952 | United Kingdom . |
| 698772 | 10/1953 | United Kingdom . |
| 1129539 | 10/1968 | United Kingdom . |
| 1295157 | 11/1972 | United Kingdom . |
| 1301551 | 12/1972 | United Kingdom . |
| 1343164 | 1/1974 | United Kingdom . |

Primary Examiner—Bruce Y. Arnold
Attorney, Agent, or Firm—Cushman, Darby & Cushman

[57] ABSTRACT

An optical correcting element using a lenticular membrane (1) stretched on a frame (2) the membrane being of a thickness less than that required to be self-supporting whereby radiation is passed even though material in a self-supporting form would obstruct the radiation, the correcting element (1, 2) being associated with a spherical mirror (3) or any form of mirror or lens and being independent or adhered to the surface of a mirror or lens.

11 Claims, 5 Drawing Figures

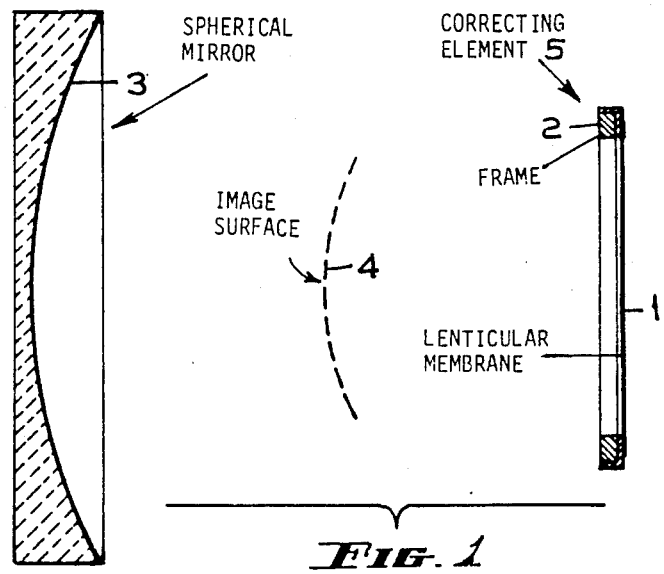
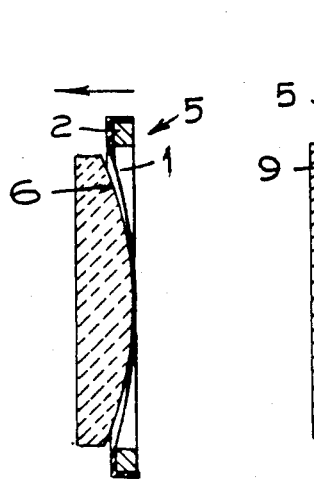
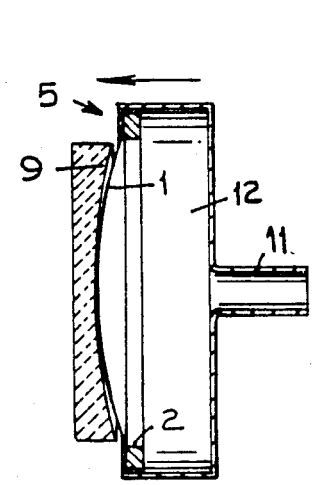
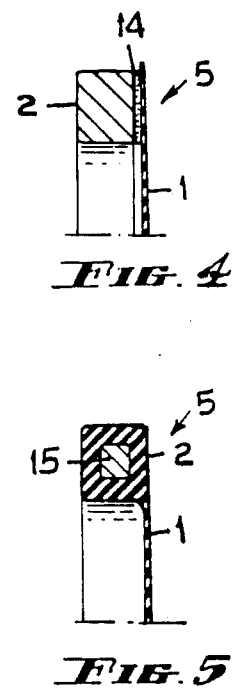

THIN PLASTIC CORRECTOR LENSES FOR OPTICAL SYSTEMS

The primary motive for this invention is to facilitate the development of inexpensive optical systems for use in infrared imaging systems. However, the invention could have wider application to optical systems used for other wavelength ranges.

The invention consists simply of an aberration-correcting optical element which corrects the aberrations of the optical system of which it is a part. The correcting element is in the form of a thin lenticular membrane of mouldable material stretched on a supporting perimeter frame such as a ring, the thickness of the membrane being varied as required to correct the aberrations of the optical system. The correcting element may be used as a separate element, or alternatively applied to another surface to vary the contour of the surface of the composite element so formed to correct the aberrations of the optical system.

The membrane is formed by injection moulding, forging or casting in a mould of which one surface may be optically flat and the other configured to produce the desired variation in membrane thickness.

Many methods of configuring the master surface of a mould for casting, moulding or forging are well known in the art. Even expensive methods of configuring the master surface could be economic if large numbers of elements are to be formed from a master surface. An advantage is that only one surface of the mould need be configured, the other being optionally an optically flat surface. When stretched the membrane will tend to form two surfaces of equal shape. The thickness variation of the membrane determines the correction of the aberrations.

A number of examples of prior art describe methods and means which have some bearing on the invention herein described. For example, Wu (U.S. Pat. No. 4,212,936) describes a method for conforming a thin sheet of thermoplastic material to glass surfaces of many different shapes and indeed his method of forming the matching pressing surface could be used to manufacture the configured master surface of the mould to form the herein described corrector lenses, but essentially, Wu does not deliberately alter the thickness of the sheet, but rather changes the contour of both surfaces of the sheet equally so that the thickness of the sheet remains constant and plays no part in correcting aberrations of the lens surface, whereas in the invention herein described the thickness is varied specifically for correcting aberrations.

On the other hand N. V. Philips Gloeilampenfabrieken (UK Pat. No. 698,772) describe a method of manufacturing a relatively rigid aberration correcting plate with an aspheric surface, with a supporting rim which may be reinforced by a metal ring. The rim and ring may not be essential depending on the rigidity of the plate, while the materials listed of which the correcting plate is made would not be suitable to transmit infrared radiation at longer wavelengths. Nor is there any description of using such a plate to modify the contour of another optical surface to improve the aberration correcting properties of that surface.

In the invention described herein, the correcting lens according to this invention comprises a lenticular membrane stretched on a frame, the membrane being made thin so that materials which in thick sections would block radiation of the required wavelength would be highly transmitting to those wavelengths. The lenticular membrane is thus deliberately made thin and necessarily must be stretched on a ring, which may or may not be reinforced, the ring ensuring that the thin non-selfsupporting membrane maintains a taut configuration necessary to achieve maximum possible definition. As an added advantage materials which are non-rigid even in thick sections, such as rubbers may be employed, thus increasing the range of materials that might be used.

In UK Pat. No. 1,295,157 WHITMARSH describes a thin metal sheet or metallised plastic foil stretched on a supporting frame and stretched by the application of air pressure to provide a mirror whose focal length varies with air pressure differential across the foil. The curve so produced is essentially spherical but unless the tension in the foil and its thickness are very uniform indeed, will be subject to local variations in curvature which would affect the optical quality of the images produced thereby. While not a serious problem for the applications cited (dental mirrors, vehicle rear vision mirrors) it may prove difficult to produce surfaces which are sufficiently accurately spherical for the high grate optical systems for which the invention described herein is addressed. Furthermore, WHITMARSH describes a method of applying air pressure to distort the surface into a spherical surface as a primary imaging device, whereas in the invention herein described, when air pressure is used it is used to distort the aspheric element to facilitate the application of the element to a concave surface.

The range of optical materials available for use in infrared optical systems embodying wavelengths greater than 3 μm is severely limited, and practically all those materials are expensive relative to the cost of optical glasses available for use at shorter wavelengths.

There are, however, several polymer materials which have useful transmission characteristics at the longer infrared wavelengths, if thin membranes are used, but it is difficult to provide adequate lens power using a thin membrane. One way of achieving a lens effect using a thin membrane is to use a Fresnel lens, as is frequently used in overhead projectors, but the image forming properties of this device are inadequate when high definition images are desired. In this context the invention seeks to approach a system resolution which is limited by diffraction by the aperture of the system.

It is desirable, if possible to use curved mirrors since the materials required are readily available and very much less expensive than commonly used infrared optical materials. But for optical systems of high relative aperture (focal length <twice the diameter) and relatively large fields of view (>10°), it is difficult to use more than two mirrors. One therefore resorts to making one or both of the mirrors aspheric, in order to provide the degrees of freedom necessary to correct the aberrations of the system. Indeed two aspheric mirrors are sometimes insufficient in which cases additional aspheric elements of the type described can be conveniently introduced. Also, unless manufactured by replication from a master surface, aspheric surfaces are expensive to produce.

For example an individual correcting element can be applied in a SCHMIDT optical system to provide a wide angle, high relative aperture system with near diffraction limited resolution, for use in an infrared optical system in the wavelength range 8 to 14 μm. The material of the lenticular membrane of the correcting element is typically polyethylene of thickness of the order of 0.3 mm and variation in thickness of the order of 0.1 mm, for a system focal length of 50 mm. In this application much thicker sections of polyethylene prove to be unsatisfactory due to scattering of the radiation in the material by small crystallites resulting in poor transmission and poor imaging quality. The thin correcting element is sufficiently thick to provide adequate mechanical strength not to rupture under tension at its thinnest section; has high transmission, (more than 80%) and sufficiently low scattering not to affect noticeably the imaging properties of the system. Stretching on a supporting frame is essential to ensure a satisfactory optical surface free of buckling and to provide a suitable means for mounting in an optical system.

With lens systems also, aspheric surfaces can reduce the number of components required to provide a given optical definition, thus reducing material cost.

As an example of applying a correcting element to another optical surface the formation of a parabolic surface from an easily produced spherical surface was considered. A correcting element formed as described above and with the necessary thickness variation is applied to the spherical surface for which it was designed so forming a parabolic surface. This surface may be coated with metal to form a parabolic mirror, or, if formed on the spherical surface of a transmitting glass element may be used to help correct aberrations of the lens.

This method of course is not confined only to modifying spherical surfaces to parabolic, but can be used to change the forms of other surfaces.

The material of which the correcting element is made must be capable of sufficient elongation under stretching not to rupture when curved.

Apart from providing an alternative means of supporting the plastic element, application to an optical transmitting lens element reduces reflectance losses, especially if the refractive indices are matched, because reflection at the two surfaces brought into contact is substantially reduced. Thus the process can be used to convert an easily manufactured spherical surface to an aspheric surface, at a much lower manufacturing cost than an equivalent aspheric lens surface manufactured into the solid lens material.

Any means, therefore, of providing aspheric surfaces in an optical system by an inexpensive method of manufacture, would contribute to the development of low cost optical systems.

To enable the invention to be fully understood, embodiments thereof will now be described with reference to the accompanying drawings in which, FIG. 1 shows in section a typical lens assembly embodying the invention when used to correct a mirror, FIG. 2 is a section showing the lens of this invention that is the lenticular membrane being applied to correct a convex lens, FIG. 3 is a similar view but showing the lenticular membrane being applied to a concave lens by use of air pressure, FIG. 4 is an enlarged fragmentary section of the edge portion of the lenticular membrane showing how it may be held on the supporting frame by a bonding material, and FIG. 5 is a similar view but showing how the plastic correcting lens can be injection moulded, forged or cast with the components as an integral unit optionally including a metal or other reinforcement ring at the perimeter frame, the membrane being integral with the perimeter frame, a reinforcement ring being shown.

Referring now to FIG. 1 this shows a lenticular membrane 1 in the form of a thin lens of polymer stretched under tension on a frame 2 forming a rigid supporting structure. The thickness of the membrane 1 varies as necessary to satisfy the optical requirements of a SCHMIDT optical system in which 3 is a spherical mirror and 4 shows the curved image surface of the system. The lenticular membrane 1 and the frame 2 form the correcting element 5.

FIG. 2 shows application of the plastic correcting element 5 to a convex surface 6. The figure shows the lenticular membrane 1 partially in contact with the convex surface 6 during the process of attaching the membrane to the surface.

In FIG. 3 the correcting element 5 is applied to a concave surface 9. In this case a means for distending the thin lenticular membrane 1 of the correcting element 5 into a form to fit the concave surface is shown. For example, air pressure is applied through tube 11 to the chamber 12, to make the curvature of the membrane 1 initially greater than that of the concave surface 9 to ensure first contact at the centre and progressive outward displacement of air. Alternatively though less conveniently the membrane 1 could be applied to the concave surface 9 when the space between the concave surface and the membrane is evacuated.

As shown in FIG. 4, a lenticular membrane 1 may be stretched and bonded to the perimeter frame 2 by an adhesive layer 14, or as shown in FIG. 5 it may be injection moulded, forged or cast to have the perimeter of the lenticular membrane 1 integral with the perimeter frame 12. The metal reinforcement ring 15 is optional.

The invention is not to be limited to these forms of construction.

Of course, although primarily invented for use in infrared optical systems, the invention is generally applicable to all optical systems, the application being limited only by the availability of polymeric materials with suitable transmitting and mechanical properties.

In all cases if necessary, an adhesive can be applied between the lenticular membrane and the supporting surface, such adhesive being selected to transmit the radiation, or alternatively the surfaces can be pretreated before contact either chemically or physically, the treatment depending on the nature of the materials of the contacting surfaces.

The claims defining the invention are as follows:

1. An optical correcting element, said correcting element varying in thickness in such a manner to correct at least in part the aberrations of an optical system; characterised by a correcting element in the form of a lenticular membrane of a thickness less than self supporting whereby it will efficiently transmit radiation of the desired wavelength even though the material of which the lenticular membrane is comprised would obstruct the desired radiation if used in thicker section; and a perimeter frame supporting the said lenticular membrane to leave the transmitting portion unobstructed; and said lenticular membrane being held under tension by the said perimeter frame to ensure a stable optical element.

2. A correcting element according to claim 1 applied as an individual optical element in an optical system.

3. A correcting element according to claim 1 adhered to the curved surface of another optical element of said optical system to aid the correction of the aberrations of the whole system, said correcting element being designed to allow for distortion of its lenticular membrane by application to the curved surface so as to lie on the said surface.

4. A correcting element according to claim 3 applied to a concave surface by a gas pressure differential to thereby make the curvature of the lenticular membrane of the correcting element greater than that of the surface to which it is to be applied.

5. A correcting element according to claim 3 whose surface is coated to form a mirror.

6. A correcting element according to claim 3 formed by moving the correcting element toward the surface of the said optical element to cause the centre of the said lenticular membrane to first contact the surface of the said optical element at the centre and then progressively outwardly to lie thereon, whereby air is displaced outwardly during the engagement of the lenticular membrane on the said optical element.

7. A correcting element according to claim 6 including the application to at least one contacting surface of an adhesive to bond the said surfaces together.

8. A correcting element according to claim 6 including the chemical or physical treatment of at least one contacting surface to promote adhesion.

9. A correcting element according to claim 1 formed by injection moulding, forging or casting the said lenticular membrane with the said perimeter frame and cooling, whereby the said lenticular membrane is placed into tension.

10. A correcting element according to claim 1 formed by bonding the said lenticular membrane while under tension onto the said perimeter frame.

11. A correcting element according to any one of claims 1 to 10 in which the material of which the correcting element is comprised is polyethylene to transmit infrared radiation in the waveband 8 $\mu$m to 14 $\mu$m.

* * * * *